(12) United States Patent
Billmaier et al.

(10) Patent No.: US 7,526,310 B2
(45) Date of Patent: Apr. 28, 2009

(54) METHODS AND APPARATUS TO INITIATE THE TRANSMISSION OF USER DATA FROM A MOBILE DEVICE

(76) Inventors: James Alan Billmaier, 22322 NE. 157th St., Woodinville, WA (US) 98077; Edward Paul Flinchem, 121 W. Prospect St., Seattle, WA (US) 98119

( * ) Notice: Subject to any disclaimer, the term of this patent is extended or adjusted under 35 U.S.C. 154(b) by 521 days.

(21) Appl. No.: 11/284,786

(22) Filed: Nov. 21, 2005

(65) Prior Publication Data

US 2007/0117586 A1    May 24, 2007

(51) Int. Cl.
*H04M 1/00* (2006.01)
(52) U.S. Cl. ............... 455/550.1; 455/466; 455/566
(58) Field of Classification Search .......... None
See application file for complete search history.

(56) References Cited

U.S. PATENT DOCUMENTS 7,236,472 B2 * 6/2007 Lazaridis et al. ......... 455/412.2
7,298,714 B2 * 11/2007 Foster ....................... 370/328

\* cited by examiner

*Primary Examiner*—Thanh C Le

(57) ABSTRACT

A wireless handheld user device or cellphone that includes the ability to transmit to a recipient digital content that is presently being presented to a user. The device includes a component that presents video or audio, a peer-to-peer activator and a processing device coupled to the component and the peer-to-peer activator. The processor includes a component that selects at least one recipient and a component that wirelessly transmits the presented at least one video or audio to the selected at least one recipient upon activation of the peer-to-peer activator. In one aspect of the invention, the transmission component includes a component that automatically selects a data protocol for the presented at least one video or audio and a component that automatically selects a transmission means from a plurality of transmission means based on cost of transmission and/or a previously defined level of urgency.

20 Claims, 3 Drawing Sheets

METHODS AND APPARATUS TO INITIATE THE TRANSMISSION OF USER DATA FROM A MOBILE DEVICE

BACKGROUND OF THE INVENTION

Mobile phones have evolved to incorporate non-voice features such as messaging (short text messages, emails, and multimedia), personal digital assistants (phone books and calendars), internet browsers, still and video cameras, and multimedia playback (ring tones, music, pictures, videos, podcasts, audio books, etc). There has recently been a desire by users to share content with each other.

Mobile phones have multiple means to send content between them (short message service (SMS or text messaging), multimedia messaging (MMS), bluetooth, and email clients using packet data (e.g., GPRS) communication channels).

However, each media transmission type and function has its own separate user interface. Some media types are tied to one type of transport. Different communication channels are billed at different rates by the carrier and some are free, such as bluetooth and WiFi.

Therefore, there exists a need to provide an interface that allows easy transmission and reception of information between mobile devices.

BRIEF SUMMARY OF THE INVENTION

The present invention provides a wireless handheld user device or cell phone that includes the ability to transmit to a recipient digital content that is presently being presented to a user. The device includes a component that presents at least one of video, audio, text, or images, a peer-to-peer activator and a processing device coupled to the component and the peer-to-peer activator. The processor includes a component that selects at least one recipient and a component that wirelessly transmits the presented at least one video or audio to the selected at least one recipient upon activation of the peer-to-peer activator.

In one aspect of the invention, the transmission component includes a component that automatically selects a data protocol for the presented at least one video or audio and a component that automatically selects a transmission means from a plurality of transmission means based on cost of transmission and/or a previously defined level of urgency.

BRIEF DESCRIPTION OF THE SEVERAL VIEWS OF THE DRAWING

The preferred and alternative embodiments of the present invention are described in detail below with reference to the following drawings.

DETAILED DESCRIPTION OF THE INVENTION

Figure 1:
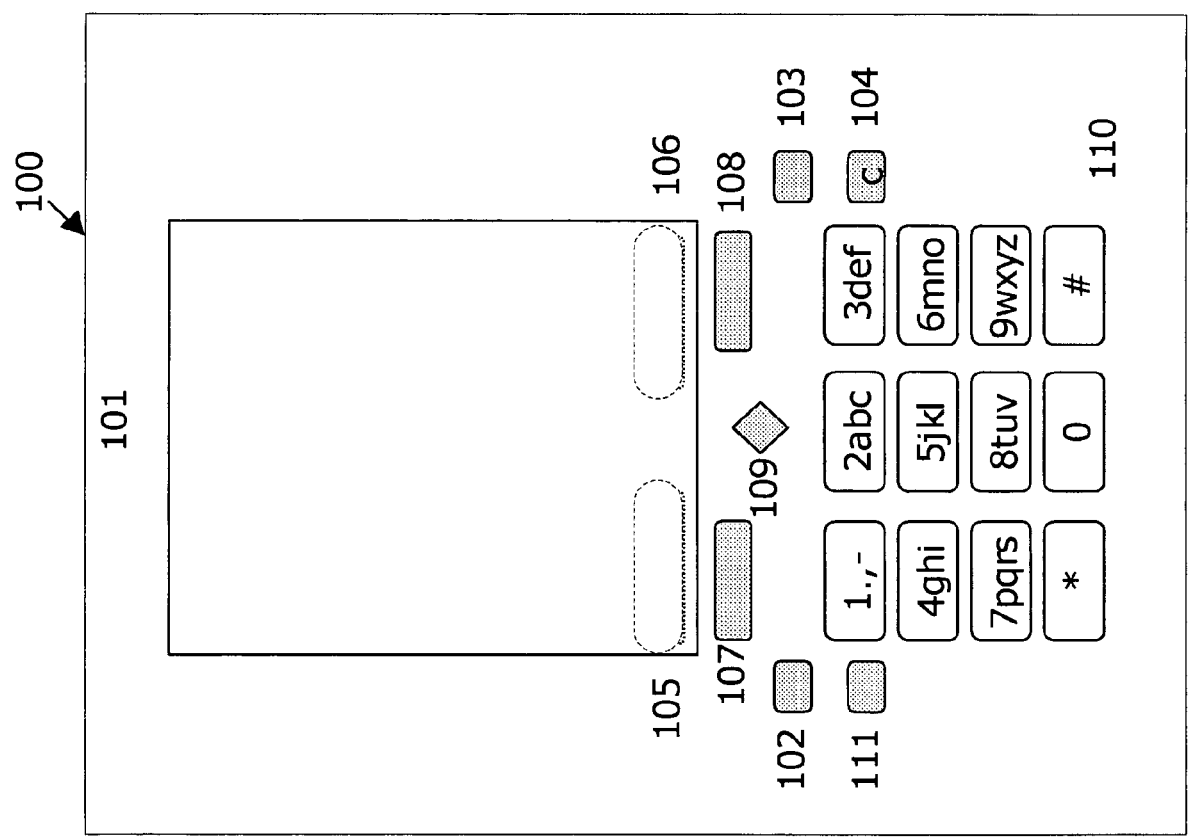
FIG. 1 is front view of a mobile wireless device formed in accordance with an embodiment of the present invention.

FIG. 1 illustrates a front view of a mobile device 100, such as a cell phone. The device 100 includes a screen 101, an answer call/initiate call (talk) key 102, a hang up/reject call key 103, a clear key 104, a 12 key phone dialing pad 110, and a send/push/share/peer-to-peer key 111. The device 100 also includes a left key 107 and a right key under the screen 108 positioned under the screen 101. The screen 101 also includes a first area 105 for displaying a label over the left key 107 and a second area 106 for displaying a label over the right key 108. The device 100 includes a 5-way switch or joystick (up, down, left, right, and press) 109 or other combination of keys or switches that allow entry of at least four directional inputs. The device 100 presents various information on the screen 101, such as text, images or video.

When a user activates the peer-to-peer key 111, information that is currently designated or presented on the screen 101 is sent to a designated recipient(s). This process will be described in more detail below.

Figure 2:
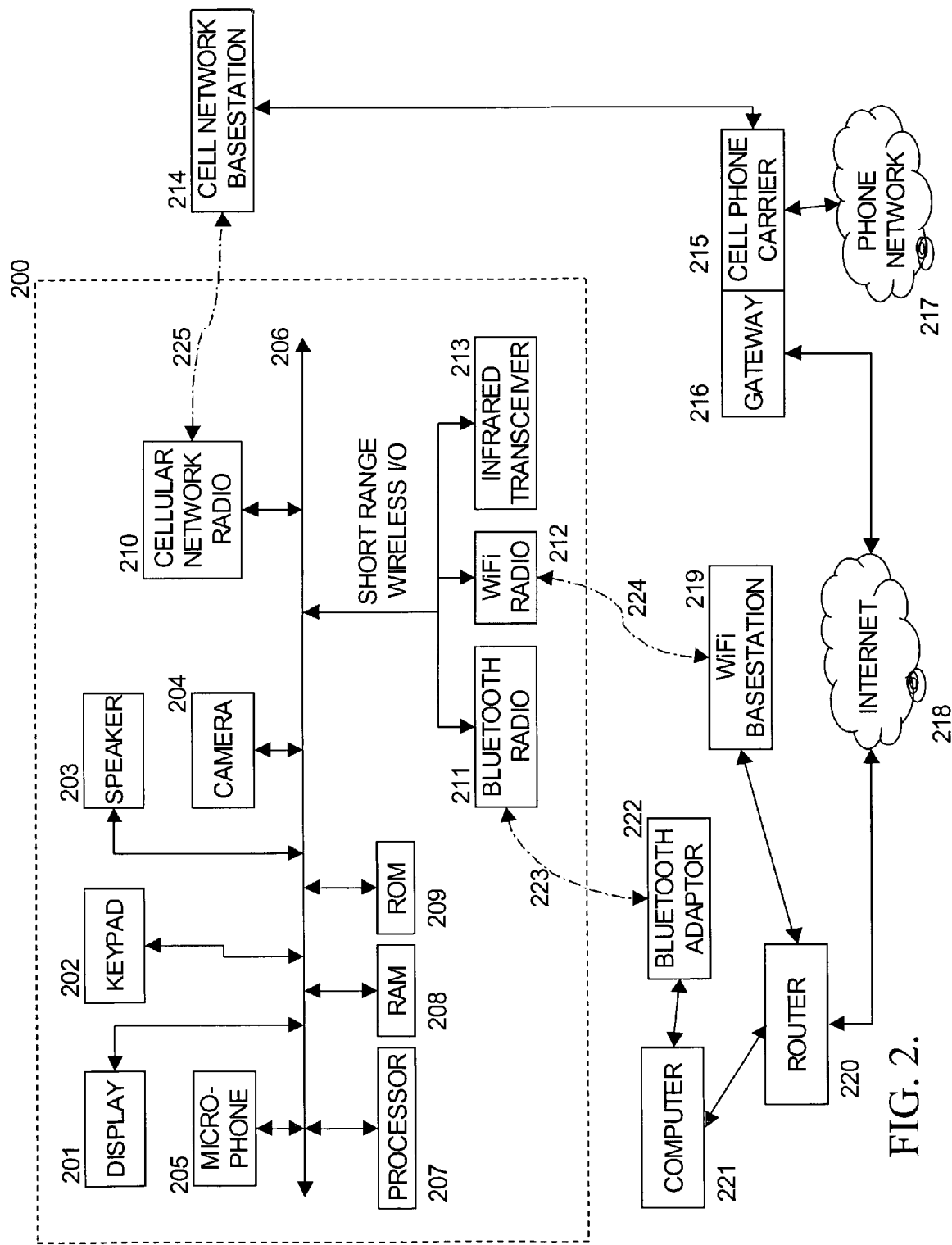
FIG. 2 is a schematic diagram of the device of FIG. 1.

FIG. 2 is a more detailed schematic of mobile device 200 and the environments in which it is used. The mobile device 200 includes a display 201, a keypad 202, speaker(s) 203, a microphone 205, a processor 207, random access memory (RAM) 208, read-only memory (ROM) 209 and optionally a camera 204, all of which are in data communication with an internal databus 206. The ROM 209 may be rewriteable FLASH memory.

Digital content and media are presented one the display 201 and/or out the speaker 203. In one embodiment, the camera 204 records still images or video and/or the microphone 205 records sound either for an audio message or as a sound track incorporated into other types of media such as still images or video.

The mobile device 200 includes a cellular network transceiver 210 that communicates via a medium range (up to many kilometers) microwave link 225 with a cellular wireless voice and data network base station 214, then through an associated mobile phone carrier 215 and through a phone network 217 or a gateway 216 to a public or private data network 218, such as the Internet. The mobile device 200 may communicate to other mobile phones/mobile devices and other devices such as computers 221 connected to through a router 218.

In one embodiment, the mobile device 200 includes a variety of short range wireless communication interfaces, including a Bluetooth transceiver 211, a Wireless Fidelity (WiFi) transceiver 212, and infrared transceiver 213. The Bluetooth transceiver 211 communicates via short range microware links 223 (10s of meters) with Bluetooth adaptors 222 connected to a computer 221 and by extension through them via the router 220 to other devices on the public or private data network 218. The Bluetooth transceiver 211 may also communicate directly to other similarly enabled mobile devices.

The WiFi transceiver 212 communicates via short range microware links 224 (10s-100s of meters) with a WiFi base station 219 connected via the router 220 (which may be incorporated into the base station 219) to the public or private data network 218.

The infrared transceiver 213 communicates with infrared adaptors (not shown) connected to a computer and by extension through them via the router 220 to other devices on the public or private data network 218. The infrared transceiver 213 may also communicate directly to other similarly enabled mobile phones/devices.

Figure 3:
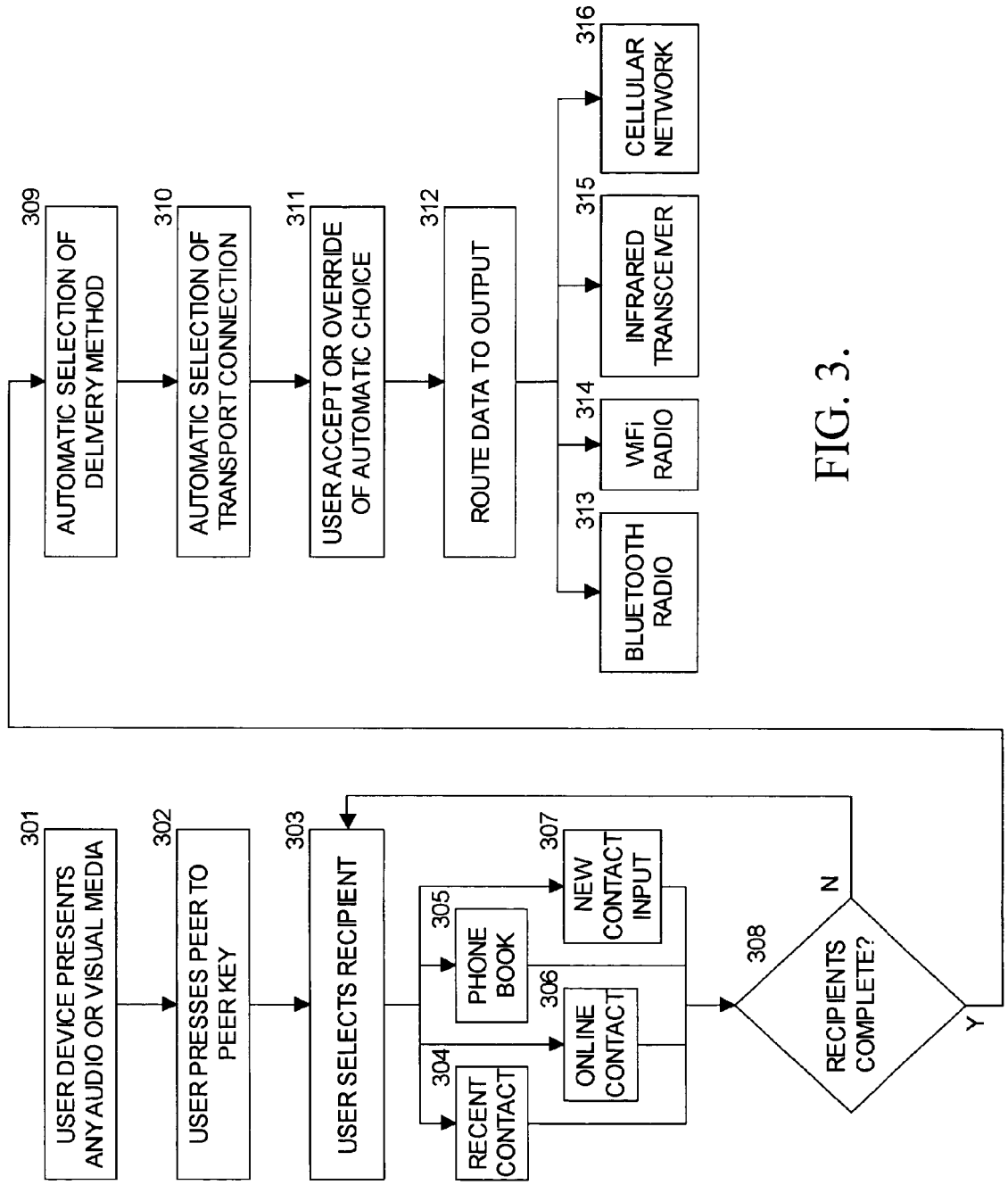
FIG. 3 is a flow diagram of an example process performed by the devices of FIGS. 1 and 2.

FIG. 3 illustrates a flow diagram of an example process performed by the mobile device shown in FIGS. 1 and 2. First, at a block 301, a user's phone/mobile device at a given moment is outputting at least a portion of digital content of various types of media. At block 302, the user presses a "send" hard key ("share" or "transmit" or similarly labeled) (send/push/share/peer-to-peer key 111) dedicated to initiating a data transmission of the implied/outputted content to one or more other devices. A key displayed on the display of the mobile device may also be designated for this data transmission purpose. At block 303, the user's phone presents a list of potential recipients. The presented list allows a user to easily choose persons/devices from a list of recent contacts, block 304, (i.e. calls answered/dialed/missed and likewise messages and emails) and/or from a list of all contacts stored in the phone, blocks 305, and/or all devices broadcasting their presence and ability to receive messages, block 306, and/or enter a completely new contact, block 307.

In one embodiment, there are additional, abstract types of recipients that can be selected. An example is the user's phone itself, i.e., a save function. Another example abstract recipient is a trash can of the user's phone, i.e., a delete function.

In one embodiment, when the user has completed selection of recipients, decision block 308, the user's phone automatically selects the most appropriate and least costly means of transmitting the data to the selected recipient(s), blocks 309 and 310. At block 312, the user's phone sends the data to the recipient(s) after an optional confirmation step where the user may accept or override the automatic choice, block 311.

The automatic selection of block 309 includes selecting the data protocol in which to transmit the content. For example, the data protocol may be any of an object push protocol, File Transfer Protocol (FTP), Simple Mail Transfer Protocol (SMTP), Multimedia Messaging Service (MMS), Short Message Service (SMS), Instant Message protocol, or any other data delivery protocol.

In an alternate embodiment, the user specifies a level of delivery urgency (immediately, within the next day, next week). The user's phone delivers the data in accordance with the level of delivery urgency. The automatic selection of block 310 includes selecting from the group of transmission transceivers 210-213 the transmission method for minimizing the cost to the user based on the defined level of message urgency or based on present reception quality the transceivers 210-213 are experiencing.

In one embodiment, the transmission function provided by key 111 may be applied to an existing key (such as the "call" key) using a distinct type of press-action, such as long press (press and hold). The transmission function provided by key 111 may be applied to an existing key that has no function in the context of the phone presenting data to the user (such as the "*" or "#" keys).

In one embodiment, the user's phone presents a configuration menu that allows the user to assign the data sending function as described in FIG. 3 to the key of their choice.

In one embodiment, the camera 204 operates in a capture mode. When the user presses the key 111, the camera 204 takes a picture (i.e., pressing the shutter button) and continues with the process shown in FIG. 3 from block 302.

In one embodiment, the user's phone stores in memory short range connection points that the phone encounters on a recurring basis (every day, every week, etc.) and the mean time based on that history until the next contact of opportunity is likely to become available. In this embodiment, the user's phone defers sending large files by storing them in an outbox for a period of time if no free connection is available when the key 111 is pressed. This allows delivery to occur when the resources are available. A similar logic applies if the phone is in the middle of nowhere with no connection of any kind.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A wireless handheld device comprising:
a component for presenting digital content;
a peer-to-peer activator; and
a processor in communication with the component and the peer-to-peer activator, wherein, upon activation of the peer-to-peer activator, the processor is configured to
receive a selection of at least one recipient;
automatically select a transceiver from a plurality of transceivers for transmitting the digital content to the at least one recipient; and
wirelessly transmit the digital content to the at least one recipient using the transceiver.

2. The device of claim 1, wherein the processor is further configured to
automatically select a data protocol for the digital content.

3. The device of claim 1, wherein the processor automatically selects the transceiver based at least in part on a cost of transmission.

4. The device of claim 1, wherein the processor automatically selects the transceiver based at least in part on a level of urgency.

5. The device of claim 2, wherein the plurality of transceivers includes one or more of a short range wireless transceiver, a wireless fidelity (WiFi) transceiver, an infrared transceiver, or a cellular network transceiver.

6. The device of claim 1, further comprising a camera, wherein the digital content is received from the camera.

7. The device of claim 1, further comprising a microphone, wherein the digital content is received from the microphone.

8. The device of claim 1, further comprising a key pad, wherein the peer-to-peer activator is a key on the key pad.

9. The device of claim 1, wherein the component for presenting the digital content includes a display, and further wherein the peer-to-peer activator is a button presented on the display.

10. A method for transmission of digital content, the method comprising:
presenting digital content on a wireless handheld device;
receiving a selection of at least one recipient;
automatically selecting a transceiver from a plurality of transceivers for transmitting the digital content to the at least one recipient, wherein the transceiver is automatically selected in response to an activation of a peer-to-peer activator; and
transmitting the digital content to the at least one recipient using the transceiver.

11. The method of claim 10, further comprising
automatically selecting a data protocol for the digital content.

12. The method of claim 10, wherein the transceiver is automatically selected based at least in part on a cost of transmission.

13. The method of claim 10, wherein the transceiver is automatically selected based at least in part on a level of urgency.

14. The method of claim 10, wherein the plurality of transceivers includes one or more of a short range wireless transceiver, a wireless fidelity (WiFi) transceiver, an infrared transceiver, or a cellular network transceiver.

15. The method of claim 10, further comprising capturing the digital content with a camera included in the wireless handheld device.

16. The method of claim 10, further comprising capturing the digital content with a microphone included in the wireless handheld device.

17. The method of claim 10, further comprising transmitting a notification message via a first network, wherein the digital content is transmitted via a second network.

18. A wireless handheld device comprising:
a component for presenting digital content;
a peer-to-peer activator; and
a processor in communication with the component and the peer-to-peer activator, wherein, upon activation of the peer-to-peer activator, the processor is configured to
receive a selection of at least one recipient;
automatically select a data protocol for transmitting the digital content to the at least one recipient; and
wirelessly transmit the digital content to the at least one recipient using the data protocol.

19. The device of claim 18, wherein the processor is further configured to automatically select a transceiver from a plurality of transceivers for transmitting the digital content to the at least one recipient.

20. The device of claim 19, wherein the processor automatically selects the transceiver based at least in part on a cost of transmission.

* * * * *

UNITED STATES PATENT AND TRADEMARK OFFICE
CERTIFICATE OF CORRECTION

PATENT NO. : 7,526,310 B2  Page 1 of 1
APPLICATION NO. : 11/284786
DATED : April 28, 2009
INVENTOR(S) : Billmaier et al.

It is certified that error appears in the above-identified patent and that said Letters Patent is hereby corrected as shown below:

On the cover page,

[*] Notice: Subject to any disclaimer, the term of this patent is extended or adjusted under 35 USC 154(b) by 521 days.

Delete the phrase "by 521 days" and insert -- by 679 days --

Signed and Sealed this

Twenty-seventh Day of April, 2010

David J. Kappos
*Director of the United States Patent and Trademark Office*